Sept. 30, 1958     W. S. SAWLE, JR     2,853,983
INTERNAL COMBUSTION ENGINE OF OPPOSED PISTON TYPE
Filed June 8, 1956     7 Sheets-Sheet 1

Inventor:
William S. Sawle Jr.
By: Fred Gerlach atty.

Sept. 30, 1958     W. S. SAWLE, JR     2,853,983
INTERNAL COMBUSTION ENGINE OF OPPOSED PISTON TYPE
Filed June 8, 1956     7 Sheets-Sheet 2
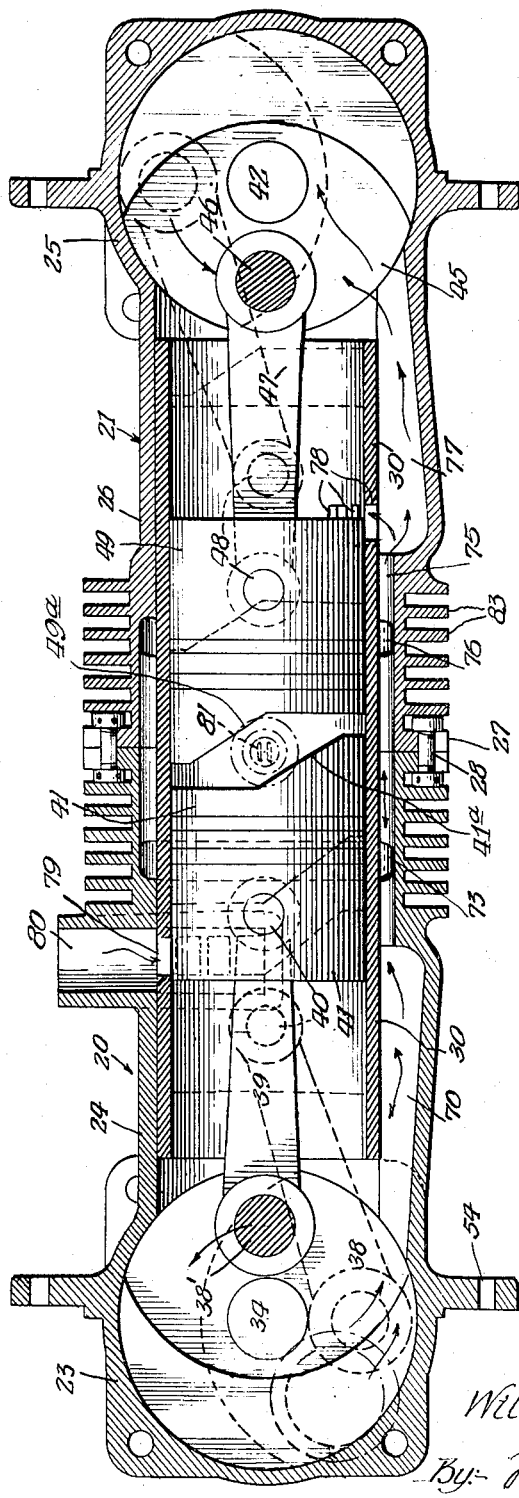
Inventor:
William S. Sawle Jr
By: Fred Gerlach
Atty.

Sept. 30, 1958  W. S. SAWLE, JR  2,853,983
INTERNAL COMBUSTION ENGINE OF OPPOSED PISTON TYPE
Filed June 8, 1956  7 Sheets-Sheet 3
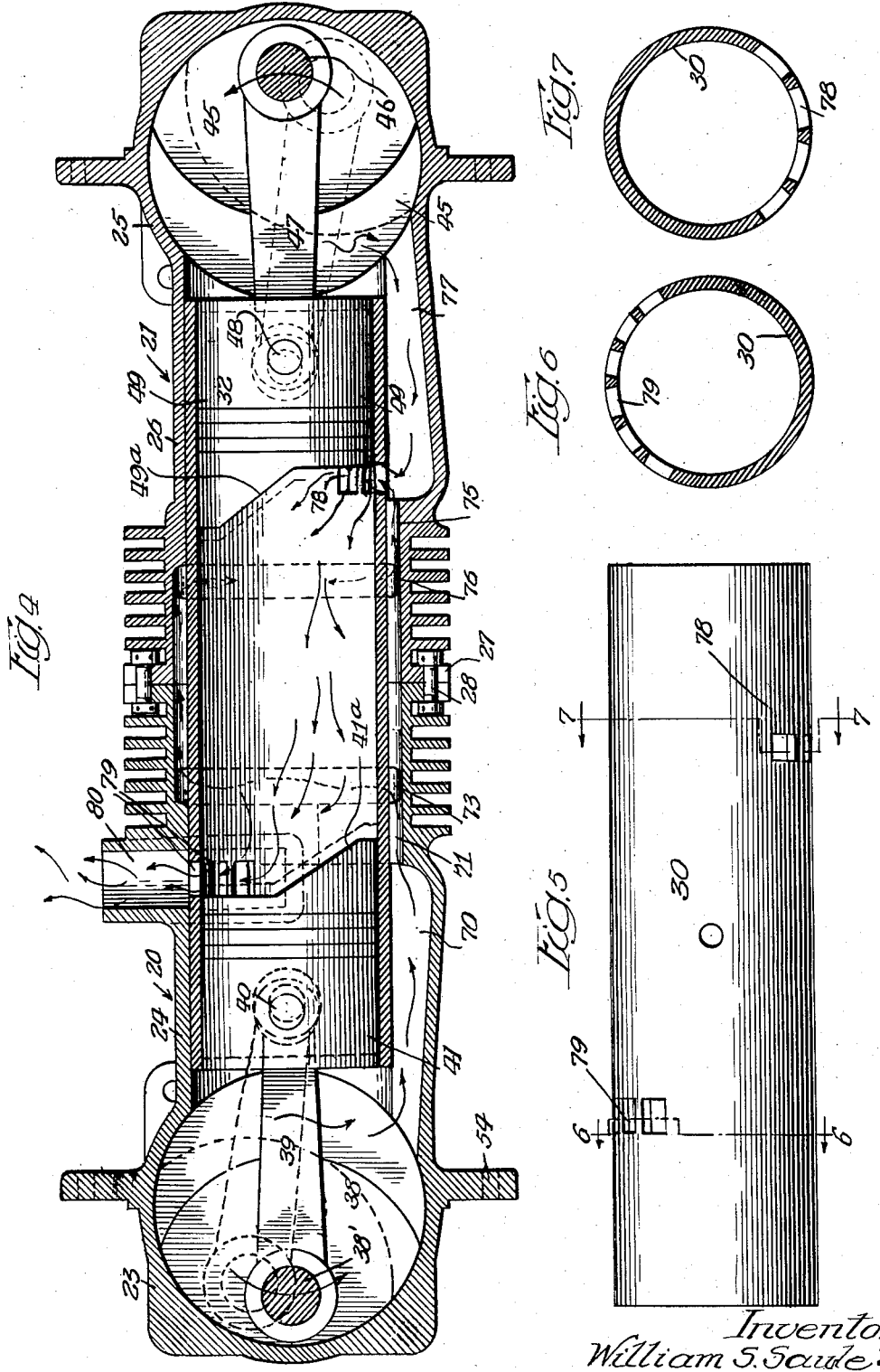
Inventor:
William S. Sawle Jr.
By Fred Gerlach  Atty.

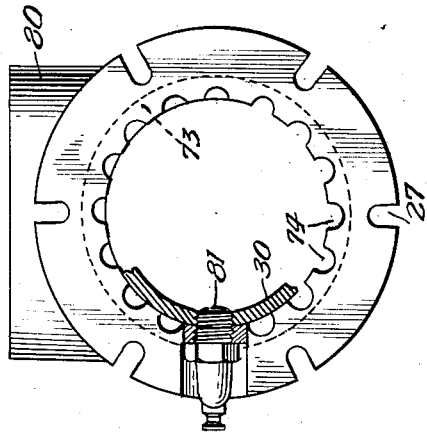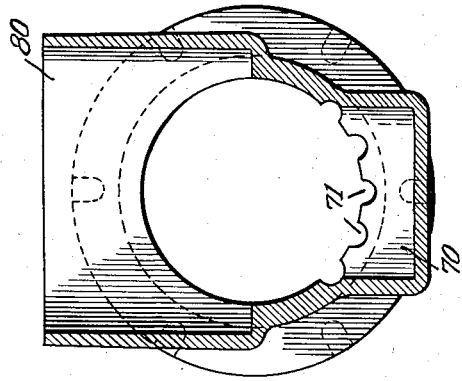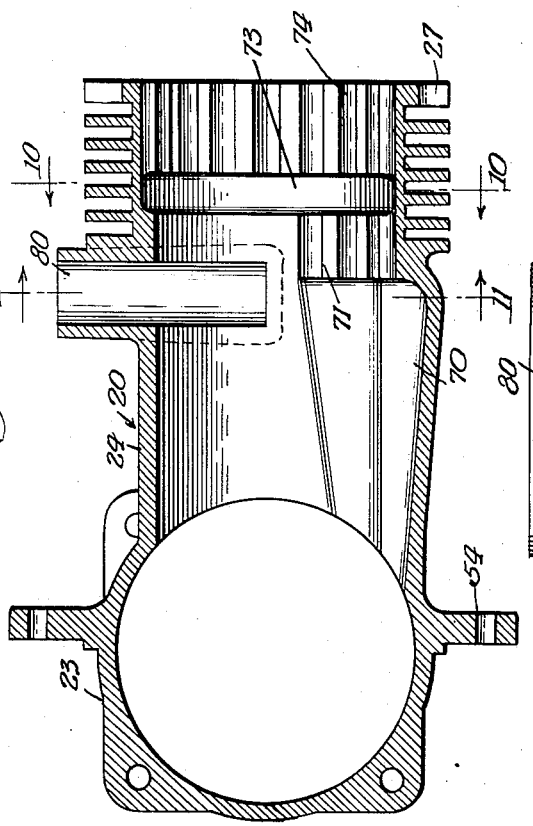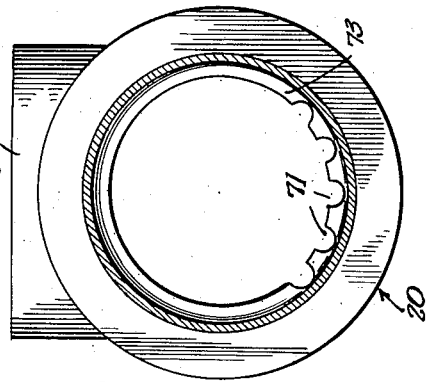

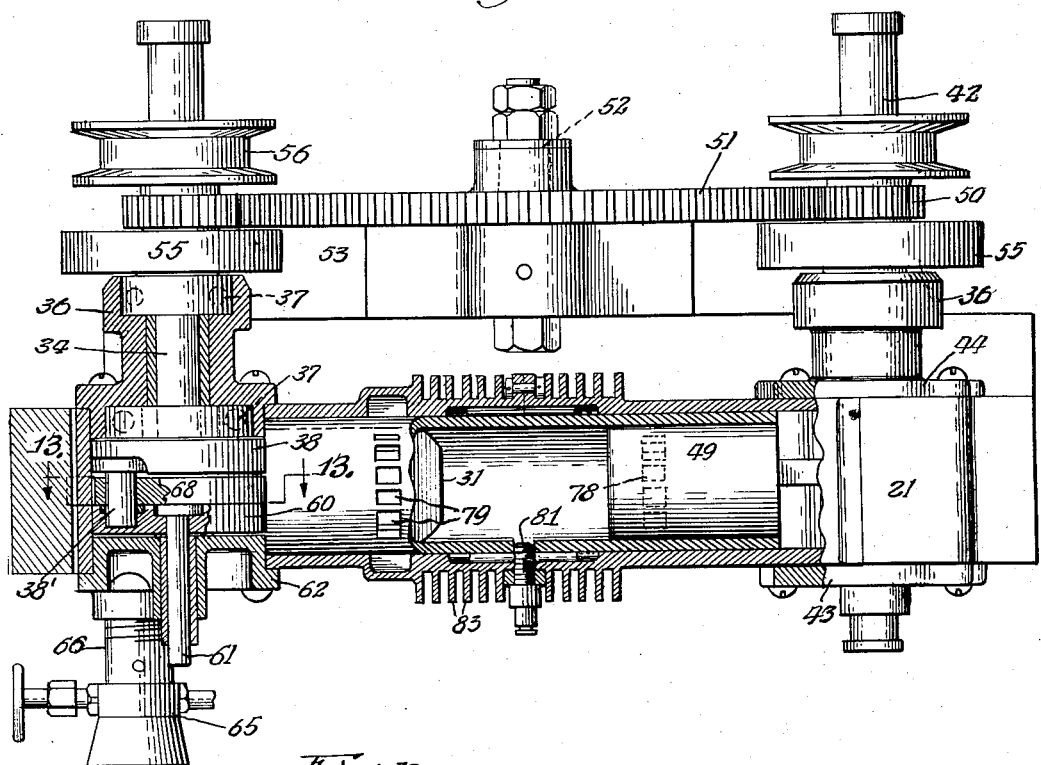
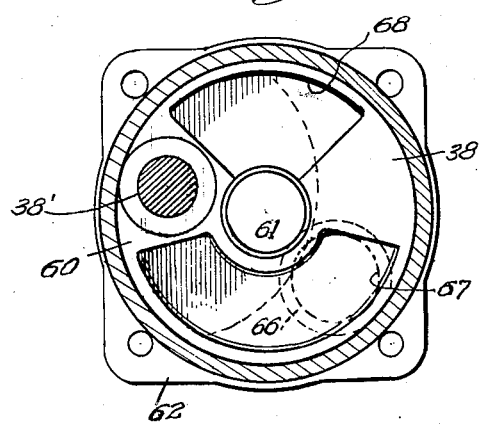

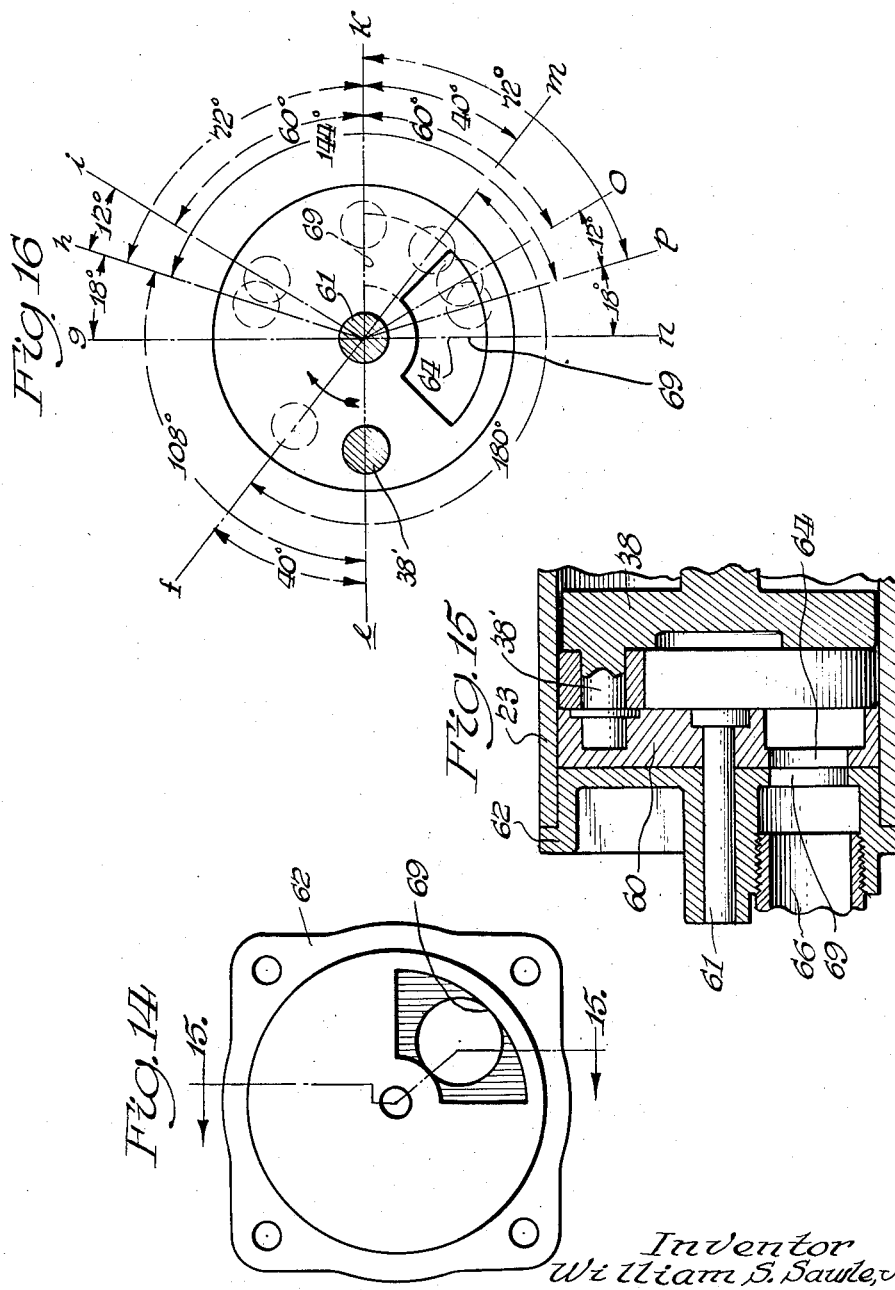

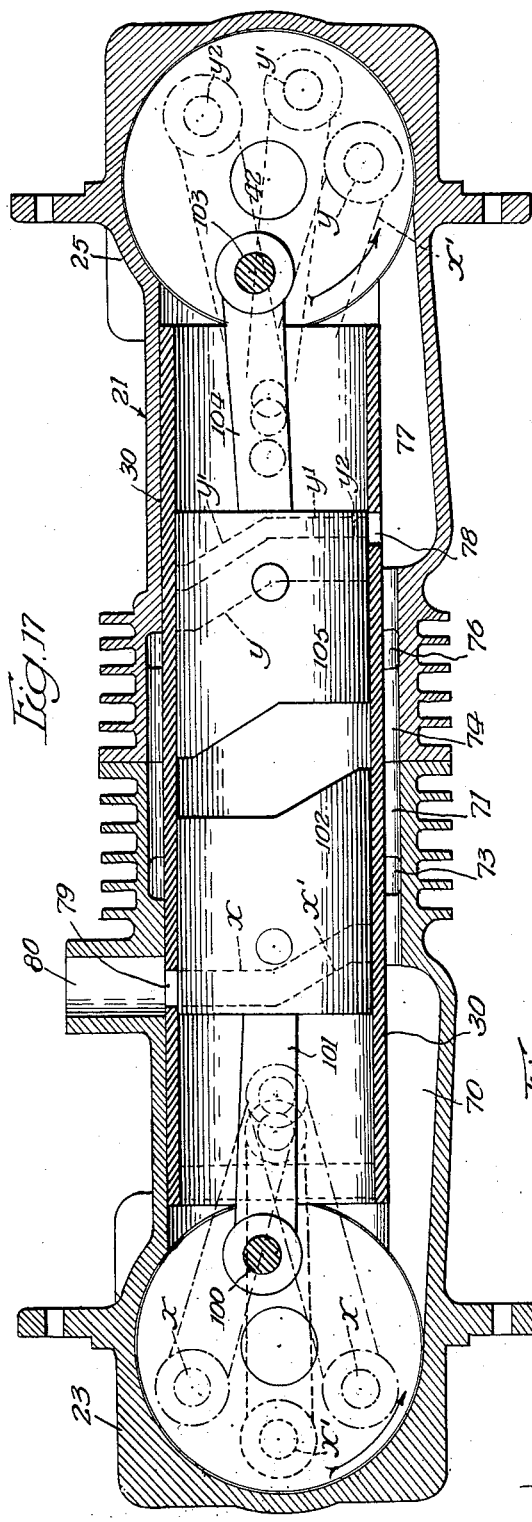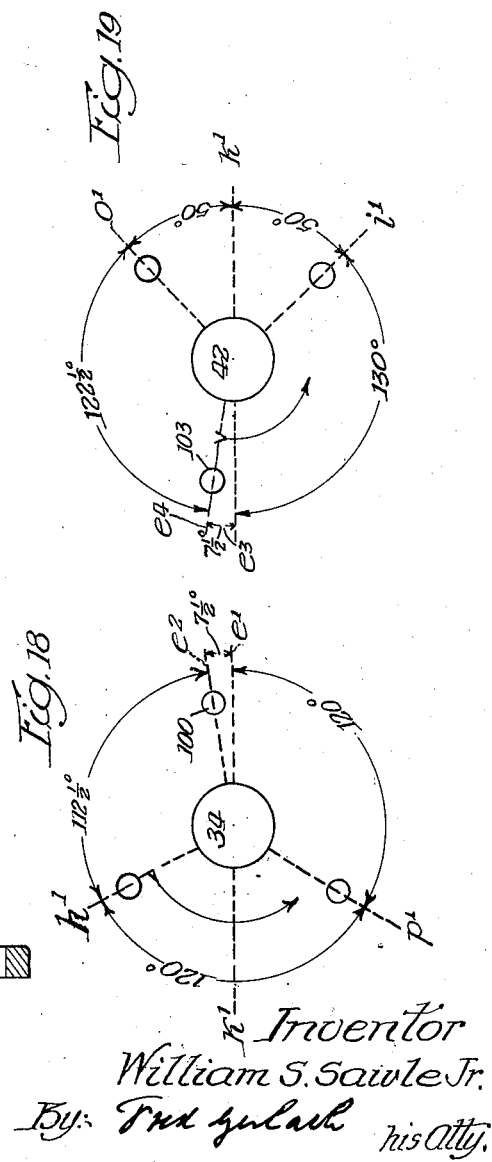

United States Patent Office 2,853,983
Patented Sept. 30, 1958

2,853,983

INTERNAL COMBUSTION ENGINE OF OPPOSED PISTON TYPE

William S. Sawle, Jr., Kenilworth, Ill.

Application June 8, 1956, Serial No. 590,296

7 Claims. (Cl. 123—51)

The invention relates to internal combustion engines and more particularly to the two-cycle type which embodies opposed pistons operating in a common cycle and between which the compression and combustion of the fuel charges occur.

One object of the invention is to provide an improved internal combustion engine in which a sleeve is utilized to form the cylinders and combustion chamber for the opposed pistons in the engine casing.

Another object of the invention is to embody a sleeve of this character in an engine-casing with members surrounding the sleeve and integral crank-cases at their outer ends.

Another object of the invention is to provide an engine in which the fresh fuel mixture is utilized to scavenge the combustion gases from the combustion chamber with minimum turbulence to prevent intermingling of the combustion gases and the fresh fuel mixture.

Another object of the invention is to provide an improved construction in which the cooling effect of the incoming fuel mixture is utilized to cool the cylinder-sleeve and the combustion chamber and to scavenge the combustion gases from the combustion chamber to increase the efficiency of the engine.

Other objects will appear from the detailed description.

The invention consists in the several novel features hereinafter described and more particularly defined by claims at the conclusion hereof.

In the drawings:

Fig. 3 is a vertical longitudinal section, the pistons being illustrated at the end of their compression strokes;

Fig. 4 is a similar view, the pistons being illustrated in full lines at the end of their power stroke with wide open inlet, and compressed fresh mixture from the crank-case in the combustion chamber for expelling and scavenging combustion products through exhaust ports;

Fig. 5 is a side elevation of the sleeve which forms the cylinders for the piston;

Fig. 6 is a section taken on line 6—6 of Fig. 5;

Fig. 7 is a section taken on line 7—7 of Fig. 5;

Fig. 8 is a longitudinal section of one of the casing-sections;

Fig. 9 is an end view of one of the casing-sections, a portion of the cylinder-forming sleeve being shown in section;

Fig. 10 is a section taken on line 10—10 of Fig. 8;

Fig. 11 is a section taken on line 11—11 of Fig. 8;

Fig. 12 is a plan view, parts being shown in elevation;

Fig. 13 is a section taken on line 13—13 of Fig. 12, the inlet valve being closed;

Fig. 14 is an inner face view of the head on one of the crank-cases which is provided with a fuel-mixture inlet port which is controlled by the rotary valve;

Fig. 15 is a section taken on line 15—15 of a portion of one of the crank-cases, the rotary valve and its connection with a crank;

Fig. 16 is a diagrammatic view illustrating the different positions of the crank-pin which operates the rotary inlet-valve for controlling the flow of fuel-mixture to the crank-cases and the control points for the intake of fuel-mixture into and the exhaust of combustion gases from the combustion chamber.

Fig. 17 is a longitudinal section of a modified form of the invention;

Fig. 18 is a diagrammatic view of positions of the crank-pin which operates the pistons which controls the exhaust ports; and Fig. 19 is a similar view of the pistons of the crank-pin which operates the piston which controls the intake of fuel into the combustion chamber.

Figure 1:
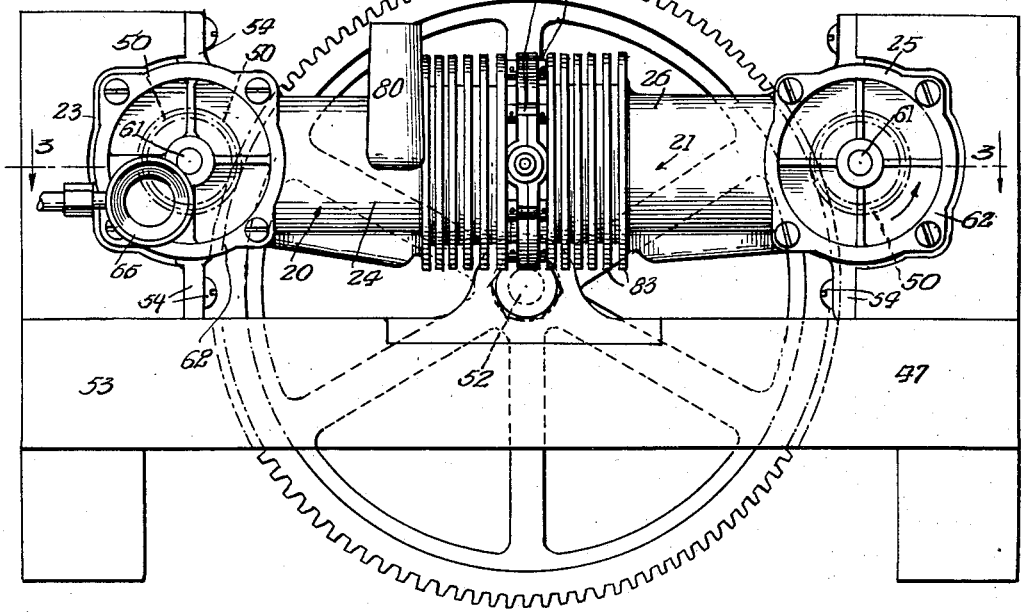
Fig. 1 is a side elevation of an engine embodying the invention.
Figure 2:
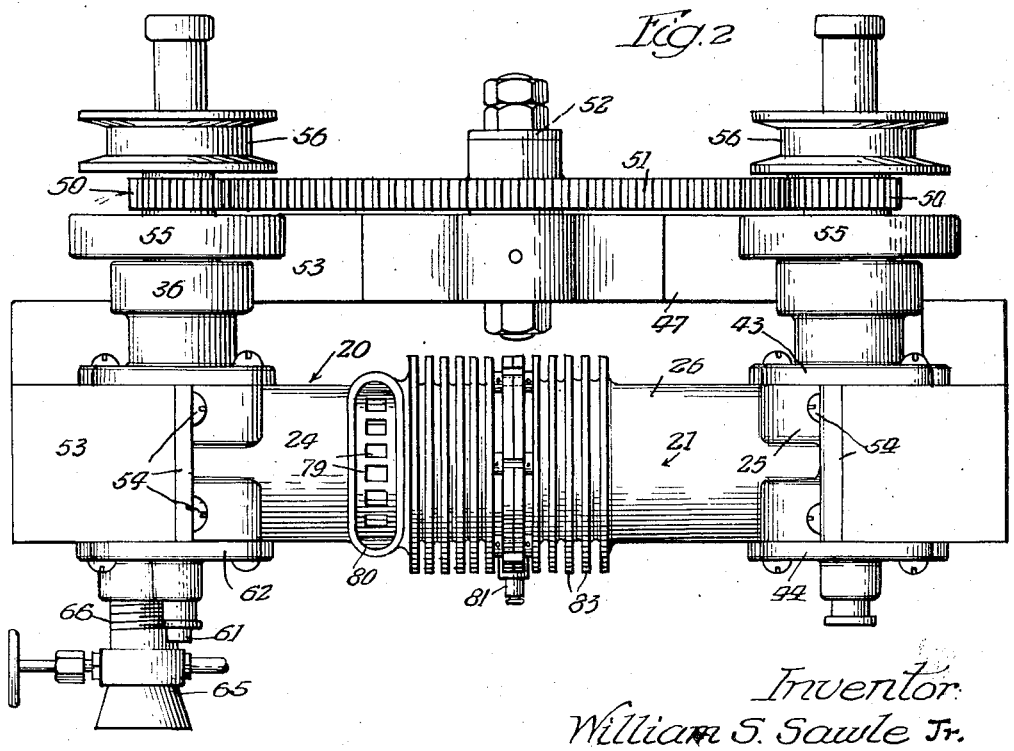
Fig. 2 is a plan view.

The invention is exemplified in an internal combustion engine which comprises a casing or housing which includes a pair of cast sections generally designated 20 and 21. Casing-section 20 has a crank-case 23 and an integral tubular extension 24. Casing-section 21 includes a crank-case 25 and an integral tubular extension 26. The extensions 24 and 26 are axially aligned, have open ends provided with abutting flanges 27 which are secured together by bolts 28 and secure the tubular extensions in axially aligned relation. A sleeve 30 is fixedly secured in the extensions 24 and 26, bridges the joint between them, and is extended in close proximity to the crank-cases to define the combustion-chamber in which the opposed pistons 31 and 32 are slidable.

A shaft 34 is journalled in bearings 37 in a head 36 which forms one side of crank-case 20 and is provided with a crank 38 at its inner end. A crank-pin or wrist-pin 38' on crank 38 is connected by a pitman 39 to a pin 40 in a piston 41 which is slidable in one end-portion of sleeve 30. A shaft 42 is journalled in suitable bearings in heads 43 and 44 which form the sides of crank-cases 21. A crank 45 on shaft 42 is provided with a wrist-pin or crank-pin 46 which is connected by a pitman 47 to a pin 48 in the piston 49 which is slidable in the opposite end-portion of the sleeve 30. Pinions 50 are secured to the crank-shafts 34 and 42 and a gear 51 mounted on a trunnion 52 meshes with said pinions for synchronizing the rotative movements of said shafts. Trunnion 52 is supported on a frame 53 on which the engine is also supported by bolts and flanges 54 on the crank-cases. Fly-wheels 55 are secured to rotate with shafts 34 and 42, respectively. A power output pulley 56 is secured on each of said shafts. The cranks 38 and 45 operate pistons 49 and 41 in a common cycle and in the same direction for compression between their controlled charges of fuel in the combustion chamber during their instrokes, and compressing fuel mixture to the crank-cases during cycles of their outstrokes.

The supply of fuel to the crank-cases is controlled by a rotary valve 60 which is journalled on a spindle 61 concentrically with crank-shaft 34 and driven by the outer end of wrist-pin 38' on said crank-shaft. Spindle 61 is mounted in a head 62 which forms the adjacent side of crank-case 20. A fuel-feed device or carburetor 65 of any suitable type is connected to supply fuel mixture to a pipe 66 which is communicatively connected to carburetor 65 and an arcuate port 69 in the stationary side-wall of head 62. Valve 60 has a face which fits against said stationary side-wall of head 62 and is provided with an arcuate port 64 which in its rotation controls the flow of fluid from pipe 66 and port 69 into the crank-case 23. When port 64 is closed, the supply of fuel to said crank-case will be cut off. The cranks 38 and 45 on shafts 34 and 40 operate on a common cycle and impart simultaneous instrokes and outstrokes to the pistons 49 and 41.

The fuel mixture flows from rotatable port 64 in valve 60 into the chamber in crank-case 23 which is open to the adjacent end of the cylinder in sleeve 30 and in which the mixture is subject to compression by piston 41 during a portion of the outstroke of said piston. The chambers in the crank-case are intercommunicatively connected for the flow of fuel mixture between them. A conduit 70 leads from the chamber in crank-case 23 to an arcuate series of longitudinal branch ducts 71 which communicate with an annular channel-duct 73 in casing-section 20 around sleeve 30. A series of longitudinal ducts 74 in casing-sections 20 and 21 communicatively connect annular channel 73 with an annular channel 76 in casing-section 21 around sleeve 30. A series of longitudinal channel-ducts 75 in casing-section 21 communicatively connect channel 76 and a conduit 77 which communicates with a longitudinal duct 77 which communicates with the chamber in crank-case 21. Ducts 80, ducts 71, annular channel-duct 73, ducts 44, annular channel-duct 76, channels 75 and conduit 77 have inner open sides contiguous to the outer periphery of sleeve 30 so that the fuel mixture in its flow between crank-case 23 and crank-case 25 will contact the outer periphery of sleeve 30 for cooling said sleeve and the combustion chamber therein.

The piston 49 controls an arcuate series of ports 78 in the lower arc and adjacent one end of sleeve 30 for the intake of fuel-mixture into the combustion chamber between the pistons. The piston 41 controls an arcuate series of ports 79 in the upper arc of and adjacent the opposite end of sleeve 30 for controlling the exhaust of combustion products from the combustion chamber. A spark plug is secured at the longitudinal center of sleeve 30 for igniting the compressed fuel charges between the opposed pistons 41 and 49 so that the longitudinally central portion of sleeve 30 functions as the combustion chamber. Fins 83 are formed on the extensions 24 and 26 of the casing around the combustion chamber. The inlet ports 78 are arranged in the lower arc or one side of sleeve 30 and the exhaust ports 79 are arranged in the upper arc or opposite side of said sleeve. The inner end-face of piston 49 is provided with an inclined end-face 49a which deflects the fresh mixture from the inlet ports 78 longitudinaly along the lower portion of the combustion chamber in sleeve 30 and the inner end-face of piston 41 is provided with an oppositely inclined end face 41a for deflecting the combustion gases toward the exhaust ports 79 in the upper portion of sleeve 30. This construction is adapted to minimize turbulence in the combustion chamber in the expulsion of the combustion gases when they are accelerated by the intake of the fresh fuel mixture.

The operation will be as follows: Assuming the opposed pistons to be in the position shown in Fig. 3, a charge of fully compressed fuel will be confined in the combustion chamber between said pistons and when ignited will impart a power stroke to shafts 34 and 42 through pitmen 39 and 47 and cranks 38 and 45. At the commencement of the outstroke of the pistons, the wrist-pin 38' will then be in the position indicated by the radial line e in Fig. 16. During the preceding cycle the port 64 in valve 60 has admitted a charge of fuel mixture into the crank-cases. Valve 60 will close when the wrist-pin 38' moves to the radial line f in said Fig. 15, and fuel mixture will be confined in the intercommunicatively connected crank-case for compression therein during the remainder of the outstroke of the pistons. The mixture admitted to crank-case 23 by valve 60 will flow from said crank-case into conduit 70 and duct 71 in casing section 20, annular channel 73, channels 74, annular channel 76, channels 75 in casing-section 21, conduit 77 and the chamber in crank-case 25. The movement of piston 49 will control the intake of fuel mixture into the combustion chamber and the piston 41 will control the exhaust of combustion products from said chamber. Compressed fresh mixture from crank-case 25 and inlet ports 78 enters one end of the combustion chamber to force the combustion gases longitudinally of sleeve 30 to the exhaust ports 79 and to stack 80 at the opposite end of the combustion chamber. The inclined end-face portion 49a on the inner end of piston 49 deflects the fuel mixture from the ports 78 which are arranged adjacent the bottom of sleeve 30 longitudinally of the combustion chamber toward the opposed piston 41 which is provided with an oppositely inclined end-face portion 41a for deflecting the exhaust gases to the exhaust ports 79 which are arranged at the top portion of sleeve 30.

The timing and operation of the rotary valve 60 to control the intake of fuel into the crank-cases, the opening and closing of the intake ports 78 by the piston 49 for controlling the flow of fuel into the combustion-chamber and the opening and closing of the ports 79 by the piston 41, for the exhaust of combustion products, are diagrammatically exemplified in Fig. 16, in which the radial line e indicates the position of crank-pin 38' on crank 38 at the end of its instroke and the radial line k its position at the end of its outstroke. The crank-pin 46 on crank 45 has corresponding movement to crank-pin 38'. When the crank-pin 38' is on the radial line e, and pistons 41 and 49 are at the completion of their instroke, the arcuate inlet port 68 in rotary valve 60 is partly open, the piston 49 cuts off the flow of fuel mixture to the combustion chamber between the pistons, the piston 41 closes the exhaust ports 79 and the previously admitted charge of fuel compressed in sleeve 36 between the inner ends of the pistons is ignited, and a power stroke will be imparted to force the pistons apart and rotate the crank-pins in the same direction. After the initial 40° of outstroke travel of wrist-pin 38' from radial line e to line f, valve 60 will close the stationary arcuate port 69 in head 62 and cut off the flow of fuel into the crank-cases. Valve 60 will retain the port 69 closed during the 140° remainder of the outstroke and the initial 40° of the instroke of wrist-pin 38' between the positions of crank-pin 38' on radial lines f and m. The mixture will then be confined in the crank-cases for compression the last 120° cycle of the outstroke of wrist-pin 38'. When the wrist-pin 38' has travelled 108° of its circular outstroke, to the position indicated by radial line h, the inner end of piston 41 will commence to uncover exhaust ports 79 and initiate the exhaust of combustion gases from one end of the combustion chamber. Piston 41 will keep ports 79 open until the wrist-pin 38' travels from radial line h to radial line p, including 72° of the circular outstroke and 72° of the circular instroke travel of wrist-pin 38' or a total cycle of 144° of said crank-pin.

The inner end of piston 49 commences to uncover the intake ports 78 for admitting compressed fuel-mixture from the crank-cases into the combustion-chamber when the crank-pin 38' travels to the radial line i or 60° before the end of its circular outstroke, and retains said ports 78 open for the admission of said mixture to the end of the combustion chamber which is remote from exhaust ports 79 while said wrist-pin 38' travels the last 60° of its outstroke and the first 60° of its instroke, or during a total cycle of 120°.

In this operation, the exhaust ports 79 at one end of the combustion chamber are opened while the crank-pin 38' travels 12° from radial line h to line i and the intake ports 78 at the opposite end of said chamber are closed. After said 12° travel of pin 38', the intake ports 78 are opened by piston 48 and remain open with the exhaust ports 79 during the final 60° outstroke travel and the initial 60° instroke travel of crank-pin 38'. The exhaust ports 79 remain open during 12° of the instroke of crank-pin 38' after the intake ports 78 are closed and while said crank-pin travels from radial line o to p. As a result, the combustion gases commence to exhaust at one end of the combustion chamber while said crank-pin travels the final 72° of its outstroke; the fuel mixture is delivered into the opposite end of the combustion-chamber during the last 60° of the outstroke travel of said crank-pin and the initial 60° of the instroke travel of said crank-pin for expelling the combustion gases from the opposite end of the combustion-chamber during said cycles of said crank-pin. During the cycle when intake ports 78 and exhaust ports 79 are open the compressed fuel mixture will accelerate the expulsion of the gases from ports 79. The exhaust ports 79 will close after an additional 12° travel of said crank-pin from the closing of the intake ports. This cycle of operation results in efficient scavenging of the combustion gases from the engine because the fuel mixture under compression enters one end of the combustion-chamber and forces the combustion gases toward and from its opposite end during a portion of the outstroke and an initial portion of the instroke of the pistons without producing turbulence which may cause intermingling of the combustion gases and the fresh fuel mixture. This also results in economy in operation. The direct contact of the fuel mixture flowing through annular channels 73 and 76 and longitudinal channels 71, 74 and 75 with the outer periphery of sleeve 30 produces efficient cooling of the engine and preheating of the fuel mixture or heat transfer from sleeve 30 to said mixture.

In the two-cycle two crank-shaft engine exemplified: it is possible to induce a full charge of mixture into the combustion-chamber without auxiliary charging equipment; the outer sides of the pistons are advantageously utilized to compress a charge with a cushioning effect and great efficiency and eliminates using power from the crank-shafts for driving charging equipment; the engine is substantially self-cooling because the fluid entering the crank-case passes through ducts disposed around the sleeve which defines the combustion chamber which is subjected to the greatest heat from combustion before it passes to the inlet ports 78 in sleeve 30; the overall height of the engine is relatively small for installations in areas having limited head-room; gaskets for cylinder-heads and poppet valves are dispensed with; and the products of combustion are scavanged unidirectionally through the combustion-chamber for power efficiency. The direction of rotation of the crank-shafts can be reversed by rotatively adjusting the crank-case head 62 with its arcuate opening 64, ninety degrees to the opposite side of the axis of the crank-shaft 34. The exhaust and intake ports in sleeve 30 will function for rotation in either direction. If it is desired to drive the crank-shafts in opposite directions, a pair of meshing gears may be substituted for the single gear 51.

In the modification illustrated in Figure 17 and diagrammatically in Figs. 18 and 19, the engine-casing with its crank-cases, sleeve 30, the fuel passages between the crank-cases, crank-shafts 34 and 42, gearing for unidirectional rotation of said shafts, and valve 60, are similar to the construction hereinbefore described. The crank-pins on said shafts are designated 100 and 103, respectively. Crank-pin 100 is connected by a pitman 101 to a piston 102 which is slidable in one end portion of sleeve 30 and controls the exhaust of combustion products to ports 79 from the combustion-chamber in sleeve 30. Crank-pin 103 on shaft 42 is connected by a pitman 104 to a piston 105 which is slidable in the opposite end portion of the chamber in sleeve 30 and controls the intake of fuel from ports 78 into the combustion-chamber in said sleeve between pistons 102 and 105.

The crank-pins 100 and 103 rotate unidirectionally around the axes of shafts 32 and 34, respectively. During the outstroke of piston 102, crank-pin 100 travels around the upper half of each of its complete rotative cycle and during the outstroke of piston 105 the crank-pin 103 travels around the lower half of its complete rotative cycle. The crank-pins 100 and 103 are co-relatively disposed on their synchronously rotating shafts 34 and 42 so that the crank-pin 100 which operates piston 102 for controlling the exhaust of combustion-products through ports 79 will commence its outstroke in advance of the commencement of the outstroke of crank-pin 103 which operates piston 105 for controlling the intake of fuel through ports 78. This causes the crank-pin 100 to operate piston 102 to advance the opening of the exhaust ports 79 relatively to the opening of the intake ports 78 by piston 103. The crank-pin 103 which rotates around the axis of shaft 42 and operates piston 105 to control the intake of fuel into sleeve 30 is rotatively positioned to trail crank-pin 100 which rotates around the axis of shaft 34 fifteen degrees of its rotative cycle so that crank-pin 100 advances the instrokes and outstrokes of piston 102 relatively to the strokes of piston 105. This advances the movement of piston 102 during its outstroke relatively to the outstroke of piston 105 to proportionately advance the opening of the exhaust ports 79 by piston 102, or to relatively delay the opening of the intake ports 78 by piston 105.

In Fig. 17, the full line position shows the rotative position of crank-pin 100 when it has travelled the initial seven and one-half degrees of its outstroke cycle and the synchronously rotating crank-pin 103 is seven and one-half degrees from the end of the instroke cycle. The exhaust ports 79 are then closed by piston 102 and the intake ports 78 are closed by piston 105. The dotted lines $x$ show the crank-pin 100 and piston 102 during their oustroke cycle when piston 102 commences to open exhaust ports 79 and the dotted lines $y$ show the simultaneous position of the crank-pin 103 and piston 105. The intake ports are then closed by piston 105. The dotted lines $x^1$ show the crank-pin 100 and piston 102 at the end of their outstroke cycle, and the dotted lines $y^1$ show the simultaneous positions of the crank-pin 103 and piston 105. The exhaust ports 79 are then fully open and the intake-ports 78 are partly open. During their succeeding instroke cycle, the crank-pin 100 and piston 102 will be again positioned at dotted lines $x$ while the crank-pin 103 and piston 105 are simultaneously in the position indicated by the dotted lines $y^2$. The exhaust ports 79 are then closing and intake ports 78 will be partly open.

The inner sides of exhaust ports 79 which are controlled by the movements of piston 102 and crank-pin 100 are disposed relatively to the longitudinal center of the combustion chamber in sleeve 30 so that said ports will commence to be opened by the inner end of piston 102 during ten degrees of its rotary outstroke cycle of said crank-pin 100 plus the fifteen degree advance due to the differently timed strokes of crank-pins 100 and 103. The inner side of intake ports 78 are disposed relatively to the longitudinal center of the combustion-chamber in sleeve 30 so that the opening of the intake ports 78 by the inner end of piston 105 will be delayed during said twenty-five degrees of travel of crank-pin 103. As a result, the exhaust ports 79 will be opened by the inner end of piston 102 during twenty-five degrees of the outstroke travel of crank-pin 100 before the intake ports 78 commence to open during the outstroke travel of piston 105 produced by crank-pin 103.

The arcuate opening 64 in the rotary-valve 60 is co-related to the crank-pin 100 to cause the said valve to open and admit fuel to crank-case 23 after crank-pin 100 has travelled the initial sixty-five degrees of its outstroke and to remain open during the travel of said crank-pin to the end of its outstroke, and the initial fifteen degrees of its instroke, or during a total travel of one hundred and thirty degrees.

With the crank-pins 100 and 103 and the exhaust ports 79 and intake ports 78 co-related as exemplified in Figs. 17 to 19, and assuming said crank-pins to be in full-line position exemplified in Fig. 17, the operation of the engine will be as follows: ignition of the compressed charge of fuel between pistons 102 and 105 will commence to force the pistons outwardly, while the exhaust ports 79 are closed by piston 102 and intake ports 78 are closed by piston 105. The neutral center at the end of the instroke is indicated by the radial lines $e^1$ (Figs. 18 and 19). When the crank-pin 100 which operates piston 102 is in the full line position shown in Fig. 17, it has travelled seven and one-half degrees of its cycle from line $e^1$ to radial line $e^2$ (Fig. 18). The position of crank-pin 103, which operates piston 105 is indicated by radial line $e^3$ (Fig. 19), is then positioned to travel seven and one-half degrees before the crank-pin reaches its neutral inward position indicated by the radial line $e^1$. When the crank-pin 100 has travelled one hundred twelve and one-half degrees from radial line $e^2$, the inner end of piston 102 will commence to open the exhaust ports 79 for the escape of combustion products from the chamber in sleeve 30. When the crank-pin 103 travels the final seven and one-half degrees of its instroke and one hundred and thirty degrees of its outstroke to the radial line $i^1$ (Fig. 19) or a total of one hundred and thirty-seven and one-half degrees, the inner end of piston 105 will commence to open the intake ports 78 for the admission of fuel to the chamber in sleeve 30 and between the pistons. As a result, the exhaust ports 79 will be open during twenty-five degrees of outstroke travel of the crank-arm 100 before the crank-pin 103 operates piston 105 to open the intake ports 78 for the entry of fuel in the combustion-chamber in sleeve 30. The crank-pin 103 operates piston 105 to open intake ports 78 after it rotates to the radial line $o^1$ (Fig. 19) including the travel of the final fifty degrees of its outstroke cycle to radial line $k^1$ (Fig. 19) and the initial fifty degrees of instroke travel from line $k^1$ to the radial line $o^1$. The crank-pin 100 operates piston 102 to close exhaust-ports 79 when the instroke position of said crank-pin is at the radial line $p^1$ (Fig. 18) or before the final ten degrees instroke travel of crank-pin 103 and the resultant travel of piston 105 which closes intake ports 78. This arrangement and timing permits the charge of fuel to be trapped between the opposed pistons and is adapted for supercharging if desired.

The invention is not to be understood as restricted to the details set forth since these may be modified within the scope of the appended claims without departing from the spirit and scope of the invention.

Having thus described the invention which I claim as new and desire to secure by Letters Patent is:

1. An internal combustion engine, comprising: a casing having a crank-case at each end thereof and a tubular structure extending between them, a sleeve secured in said structure and defining a combustion-chamber, opposed pistons slidable in the combustion-chamber and said sleeve, a crank-shaft and crank in each crank-case operatively connected to the pistons, respectively, passages for contacting fuel with the periphery of the sleeve intercommunicatively connecting the crank-cases; intake ports in the sleeve adjacent one end of the combustion-chamber for fluid from the crank-cases, and outlet ports in the sleeve adjacent the opposite end of the combustion-chamber, said intake and outlet ports being disposed to open near the ends of the outstroke of the pistons, respectively, and means for controlling the inlet of fluid to said intercommunicatively connected crank-cases for compression by the outer ends of the pistons during their outstrokes.

2. An internal combustion engine, comprising: a casing including sections, tubular extensions with abutting inner ends, a tubular structure extending between them detachably secured together and crank-cases having annular walls integral with said extensions, a sleeve secured in said annular walls extending across said inner ends and defining a combustion-chamber, opposed pistons slidable in the combustion-chamber in said sleeve, a crank-shaft and crank in each crank-case operatively connected to the pistons, respectively, channels for fuel intercommunicatively connecting the crank-cases having open sides for directly contacting the fuel with the sleeve; intake ports in the sleeve adjacent one end of the combustion-chamber for fluid from the crank-cases, and outlet ports in the sleeve adjacent the opposite end of the combustion-chamber, said intake and outlet ports being disposed to open near the ends of the outstroke of the pistons, respectively, and means for controlling the inlet of fuel to the intercommunicatively connected crank-cases for compression by the outer ends of the pistons during their outstrokes.

3. An internal combustion engine, comprising: a casing including sections, tubular extensions with abutting inner ends, a tubular structure extending between them, detachably secured together and crank-cases having annular walls integral with said extensions, a sleeve secured in said annular walls extending across said inner ends and defining a combustion-chamber, opposed pistons slidable in the combustion-chamber in said sleeve, a crank-shaft and crank in each crank-case operatively connected to the pistons, respectively, for intercommunicatively connecting the crank-cases including annular channels in the casing sections and longitudinal channels between the annular channels, having open sides for directly contacting the fuel with the sleeve; intake ports in the sleeve adjacent one end of the combustion-chamber for fluid from the crank-cases, and outlet ports in the sleeve adjacent the opposite end of the combustion-chamber, said intake and outlet ports being disposed to open near the ends of the outstroke of the pistons, respectively, and means for controlling the inlet of fuel to the intercommunicatively connected crank-cases for compression by the outer ends of the pistons during their outstrokes.

4. An internal combustion engine, comprising: a casing having a crank-case at each end thereof and a tubular structure extending between them, a sleeve secured in said structure and defining a combustion-chamber, opposed pistons slidable in the combustion-chamber and said sleeve, a crank-shaft and crank in each crank-case operatively connected to the pistons, respectively, passages for fuel intercommunicatively connecting the crank-cases including annular channels in the tubular structure having their inner sides open for contacting the fuel with the periphery of the sleeve; intake ports in the sleeve adjacent one end of the combustion-chamber for fluid from the crank-cases, and outlet ports in the sleeve adjacent the opposite end of the combustion-chamber for fluid from the crank-cases, said intake and outlet ports being disposed to open before the ends of the outstroke of the pistons, respectively, and valve-means for controlling the inlet of fluid into said ducts and confining the fluid in the crank-cases for compression by the outer ends of the pistons during their outstrokes.

5. An internal combustion engine, comprising: a casing having a crank-case at each end thereof and a tubular structure extending between them, a sleeve secured in said structure and defining a combustion-chamber, opposed pistons slidable in the combustion-chamber and said sleeve, a crank-shaft and crank in each crank-case operatively connected to the pistons, respectively, passage for fuel intercommunicatively connecting the crank-cases including annular channels in the tubular structure, longitudinal channels between the annular channels and arcuate series of longitudinal channels between the annular channels and the crank-cases, said channels having open inner sides for directly contacting the fuel with the outer periphery of the sleeve; intake ports in the sleeve adjacent one end of the combustion-chamber for fluid from the crank-cases, and outlet ports in the sleeve adjacent the opposite end of the combustion-chamber, said intake and outlet ports being disposed to open before the ends of the outstroke of the pistons, respectively, and valve-means for controlling the inlet of fluid into said ducts and confining the fluid in the crank-cases for compression by the outer ends of the pistons during their outstrokes.

6. An internal combustion engine, comprising: a casing having a crank-case at each end thereof and a tubular structure extending between them having a cylindrical combustion-chamber therein, opposed pistons slidable in the combustion-chamber, a crank-shaft and crank in each crank-case operatively connected to the pistons, respectively, passages for fuel intercommunicatively connecting the crank-cases, including annular channels around the sleeve, longitudinal channels between the annular channels, and channels connecting the crank-cases and the annular channels, said channels having open inner sides for directly contacting the fuel and the outer periphery of the sleeve, intake ports in the sleeve adjacent one end of the combustion-chamber for fluid from the ducts between the crank-cases, and outlet ports in the sleeve adjacent the opposite end of the combustion-chamber, said intake and outlet ports being disposed to open before the ends of the outstrokes of the pistons, respectively, and valve-means for controlling the inlet of fluids into said ducts and confining the fluid in the crank-cases for compression by the outer ends of the pistons during their outstrokes.

7. An internal combustion engine, comprising: a casing including sections having tubular extensions with abutting inner ends secured together and crank-cases at the outer ends thereof, a sleeve secured in said tubular extensions and extending across said inner ends and defining a cylindrical combustion-chamber, opposed pistons slidable in the combustion-chamber and said sleeve, a crank-shaft and crank in each crank-case operatively connected to the pistons, respectively, passages for fuel intercommunicatively connecting the crank-cases, including annular channels in the tubular extensions, respectively, and around the sleeve and longitudinal channels around the sleeve and in the extensions and between the annular channels, said channels having open sides for contacting the fuel with the outer periphery of the sleeve; intake ports in the sleeve adjacent one end of the combustion-chamber for fluid from the crank-cases, and outlet ports in the sleeve adjacent the opposite end of the combustion-chamber, said inlet and outlet ports being disposed to open before the ends of the outstrokes of the pistons, respectively, and valve-means for controlling the inlet of fuel into said ducts and confining the fluid in the crank-cases for compression by the outer ends of the pistons during their outstrokes.

References Cited in the file of this patent

UNITED STATES PATENTS

| | | |
|---|---|---|
| 871,539 | Van Auken | Nov. 19, 1907 |
| 1,578,476 | Slaght | Mar. 30, 1926 |
| 1,699,111 | Lyons | Jan. 15, 1929 |
| 2,380,120 | Pfeifer | July 10, 1945 |
| 2,440,310 | Thege | Apr. 27, 1948 |
| 2,451,723 | Eagle | Oct. 19, 1948 |
| 2,489,150 | McCoy | Nov. 22, 1949 |

FOREIGN PATENTS

| | | |
|---|---|---|
| 906,633 | Germany | Mar. 12, 1954 |